No. 750,259. PATENTED JAN. 26, 1904.
W. H. COFFELT.
CAN WEIGHING MACHINE.
APPLICATION FILED MAR. 31, 1903.
NO MODEL. 3 SHEETS—SHEET 1.

Witnesses
E. K. Stewart
Jno. E. Parker

W. H. Coffelt, Inventor.
by C. A. Snow & Co.
Attorneys

No. 750,259. PATENTED JAN. 26, 1904.
W. H. COFFELT.
CAN WEIGHING MACHINE.
APPLICATION FILED MAR. 31, 1903.
NO MODEL. 3 SHEETS—SHEET 3.

Witnesses
E. F. Stewart
Jno. E. Parker

W. H. Coffelt, Inventor.
by C. A. Snow & Co.
Attorneys

No. 750,259.                                  Patented January 26, 1904.

UNITED STATES PATENT OFFICE.

WILLIAM H. COFFELT, OF ANACORTES, WASHINGTON.

CAN-WEIGHING MACHINE.

SPECIFICATION forming part of Letters Patent No. 750,259, dated January 26, 1904.

Application filed March 31, 1903. Serial No. 150,483. (No model.)

*To all whom it may concern:*

Be it known that I, WILLIAM H. COFFELT, a citizen of the United States, residing at Anacortes, in the county of Skagit and State of Washington, have invented a new and useful Can-Weighing Machine, of which the following is a specification.

This invention relates to certain improvements in that class of devices employed for weighing or testing the weight of cans or other packages or articles in order to ascertain whether or not they be of full weight, such cans or packages as are lacking in weight being automatically rejected by the machine.

The principal object of the invention is to provide a mechanism by which the sorting of the cans is accomplished automatically, the cans to be tested being fed to the machine at one point, while the full-weight and light-weight cans are discharged at different points, being separated into different groups.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
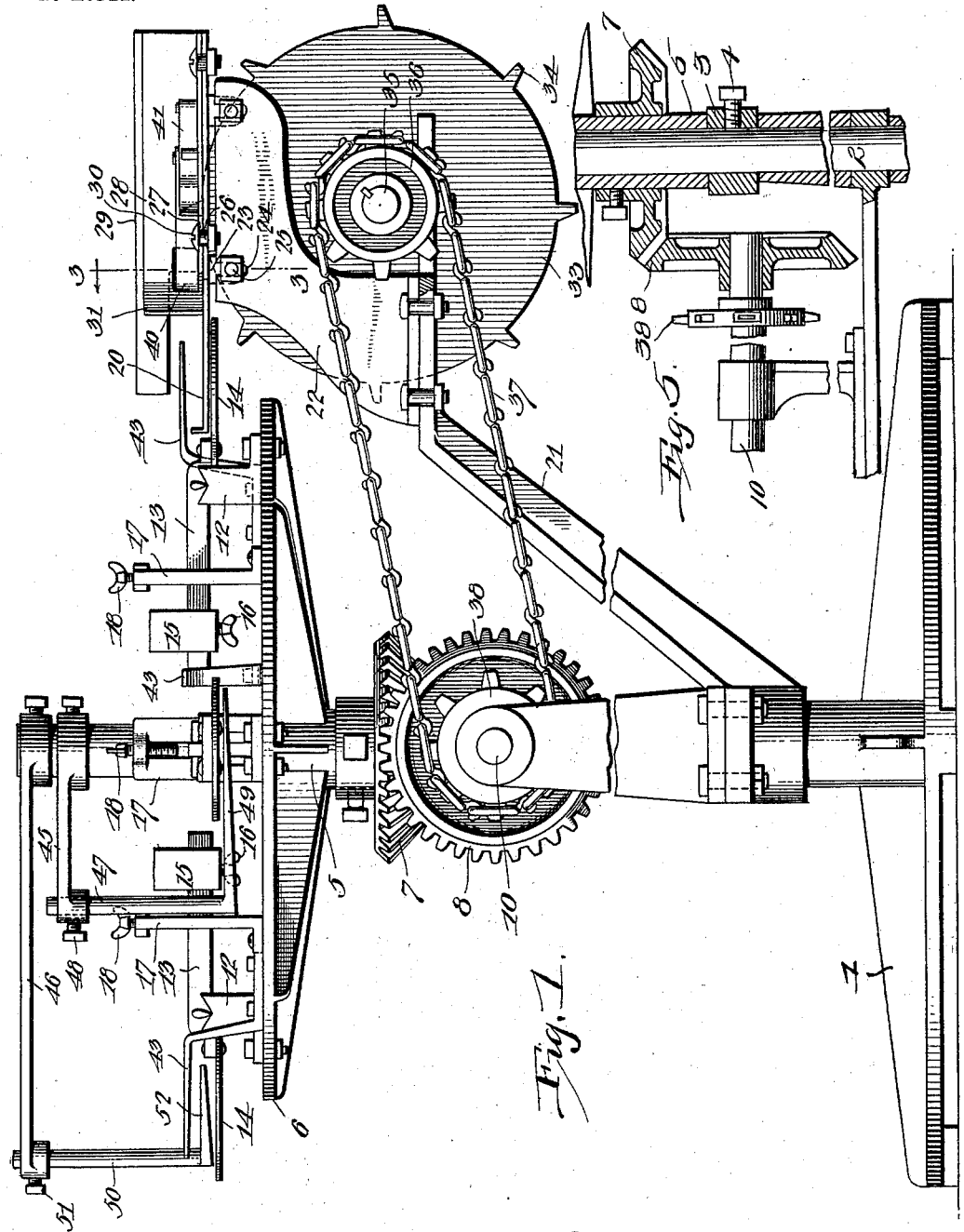
Figure 2:
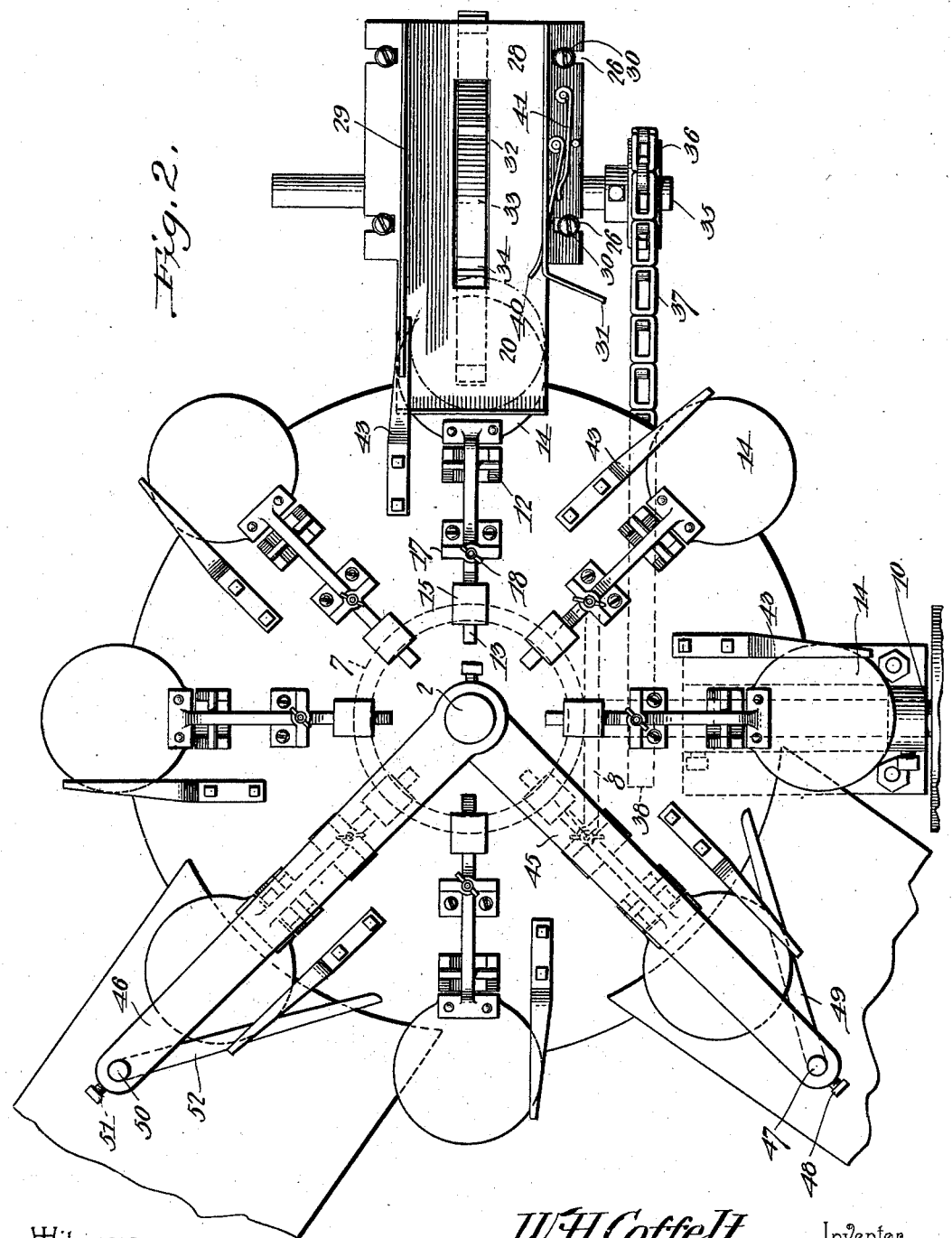
Figure 3:
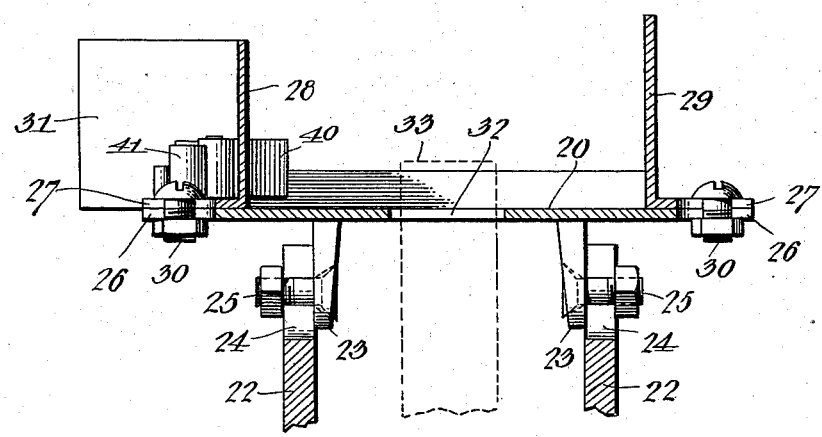
Figure 4:
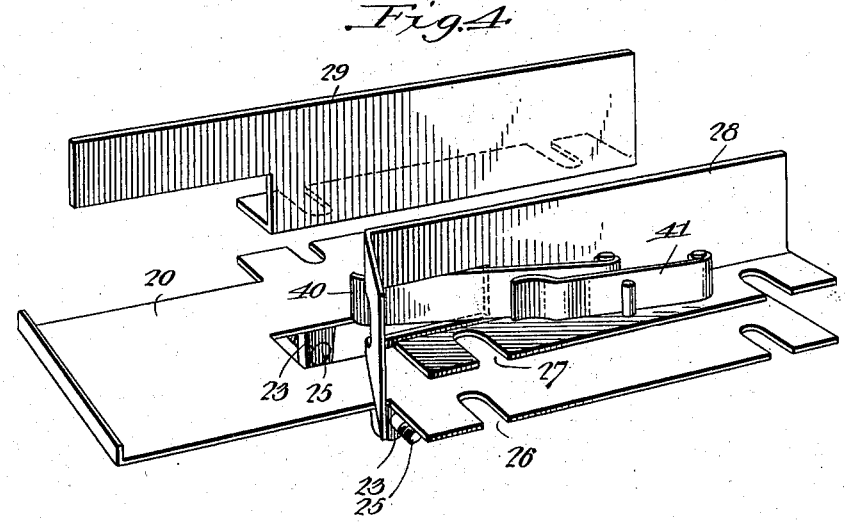

In the accompanying drawings, Figure 1 is a side elevation of a weighing or testing machine constructed in accordance with the invention. Fig. 2 is a plan view of the same. Fig. 3 is a detail sectional view, on an enlarged scale, on the line 3 3 of Fig. 1. Fig. 4 is a detail perspective view of the feed-chute. Fig. 5 is a transverse sectional view of the operation of the lower portion of the machine, illustrating the double mounting of the driving mechanism.

Similar numerals of reference are employed to indicate corresponding parts throughout the several figures of the drawings.

The various parts of the mechanism are supported on a suitable base 1, to which is rigidly secured a vertical stationary spindle 2. At a point intermediate of the length of the spindle is a collar 3, held in place by one or more set-screws 4 and serving as a support for an elongated sleeve or hub 5, depending from a revoluble scale-carrying table 6. To the sleeve 5 is secured the hub of a miter-gear 7, intermeshing with a similar miter-gear 8, mounted on a horizontally-disposed driving-shaft 10, carried in suitable brackets and receiving motion from any suitable source of power.

The table 6 is provided with any desired number of radially-arranged weighing mechanisms, eight being shown in the present instance and said mechanisms being consecutively brought into operative position to receive cans or other articles to be weighed or tested from a feeding-chute.

The weighing mechanisms each comprise a standard 12, bifurcated and having a recessed top to form a fulcrum for a scale-beam 13, which carries a receiving-platform 14 at its outer end and an adjustable counter weight or poise 15 at its inner end. The weight or poise is provided with a set-screw 16, by which it may be locked in position on the scale-beam in order to counterbalance any predetermined load. Each scale-beam passes through a vertically-disposed slot in a standard 17, which prevents lateral play of the beam during the reception and delivery of the load, and in the upper end of the standard is placed an adjustable screw 18, by which the upward movement of the inner end of the scale-beam may be limited. The several platforms are presented successively under the delivery end of a feed-chute 20, receiving cans therefrom and as the table rotates discharging said cans into groups according to weight.

21 designates a standard carrying a pair of spaced supporting brackets or plates 22, within the upper ends of which fit depending flanges 23, forming a part of the chute 20. The flanges are provided with bolt-receiving openings, and the brackets have vertical slots 24 for the passage of bolts 25, the construction permitting the adjusting of the bed of the chute to any desired height and the locking of said chute in any desired position of adjustment. The bottom of the chute is provided with horizontal slots 26 at each edge, and registering therewith are similar slots 27 in the lower webs or flanges of the side plates 28 and 29 of the chute. The side plates are locked in the bottom of the chute by means of bolts 30, and by adjusting the distance between these side plates the chute is adapted to receive cans of any desired width. It will be noted that the side plate 29 is extended to a point close to the outermost end of the chute, while the side plate 28 is somewhat shorter and is bent outwardly, as indicated at 31, to thereby form a guide to assist in directing the cans to the scale-platforms.

The bottom of the slot 32, through which passes the periphery of a feed-wheel 33, having radially-projecting can-engaging fingers 34, which are successively brought into contact with cans on the chute and force the latter toward the discharge end thereof. The feed-disk 33 is secured to a shaft 35, mounted in suitable bearings on the bracket 21, and provided at its outer end with a sprocket-wheel 36, over which passes a link belt 37, connecting said sprocket-wheel to a similar sprocket-wheel 38 on the main driving-shaft 10. The diameters of the two sprocket-wheels are equal, and the diameters of the two miter-gears, which connect the driving-shaft and the table, are the same, so that an equal degree of movement is imparted to each. As the table in the present instance is provided with eight weighing-scales, the feed-disk 33 is provided with a similar number of can-feeding fingers, and the table and disk revolve at the same speed. Cans which are fed by the fingers 34 are forced beyond a spring-retaining finger 40, extending through a suitable opening in the side 28 of the chute and normally projecting into the path of the cans by a small spring 41. This finger serves only as a spacing means for the cans in order to prevent clogging of the feed or movement of the cans beyond a given point at each operation.

When the scales or testing-platforms 14 are empty, they are disposed in a horizontal plane immediately below the bottom of the chute, as best shown in Fig. 1, so that the cans may be forced from the chute to a position directly on the platform without danger of falling.

To the platform are secured eight can-feeding fingers 43, each extending in a plane parallel with the scale-beam with which it is associated and projecting upwardly and outwardly in a plane beyond the periphery of the table 6, the horizontal plane of the outer portion of the finger being above the bottom of the chute and said finger passing through a suitable slot or opening formed by cutting away the lower and inner portion of the side 29 of the chute, and each time one of the fingers passes over the chute it engages a can at the end of said chute and forces the can onto the platform of the scale or testing mechanism, the platform descending a distance proportionate to the weight of the can and its contents.

The upper end of the stationary spindle 2 is extended beyond the top of the table and carries two radiating arms 45 and 46, spaced at a convenient distance from each other. The outer end of the arm 45 is provided with a vertical opening for the reception of a depending rod 47, which may be adjusted both vertically and circumferentially and locked in position by a set-screw 48. At the lower end of the rod 47 is an inclined or curved cam 49, adapted to engage cans of full weight carried by the platforms and to deliver such cans to a discharge-chute. The arm 46 is provided with a similar rod 50, which may be locked in position by a set-screw 51, and carries a cam 52, adapted to engage and effect the discharge of lighter cans, it being observed that the cam 49 is in a horizontal plane considerably below that in which the cam 52 is disposed.

In the operation of the device the cans or other articles to be tested or weighed are delivered to the chute and fed in any suitable manner to a point where they may be engaged by the fingers 34 and when so engaged are forced one by one in the direction of the end of the chute. When a scale-beam approaches the chute, its platform is empty and passes directly under the bottom of the chute, while the outwardly-projecting feeding-finger 43 engages the side of the can at a point above the bottom of the chute and forces said can to position on the scale-platform. As the rotative movement of the table continues the can, if full, will be engaged and removed by the cam 49; but if the can is of light weight the platform will remain in a position slightly above the top of the cam 49, and the continued movement of the table will then bring the light-weight can into engagement with the cam 52, the light-weight cans being delivered at a point distant from those of the full weight.

It will be observed that all of the parts of the mechanism are adjustable, so that the machine may be employed for testing or weighing cans of different size.

While the mechanism has been designed more especially for the testing of cans filled with food products, it will be understood that it may be employed in connection with packages or receptacles of any kind or character or for the sorting of different articles without departing from the spirit of the invention.

Having thus described the invention, what is claimed is—

1. In a weight-testing machine, a movable carrier, scale-beams mounted thereon and each provided with an article-receiving platform, means for feeding the articles to be tested, and a plurality of discharging means of which one is arranged in a horizontal plane below the plane of the unloaded or lightly-loaded platform and the second is disposed in a plane above the plane of such platform.

2. A weight-testing device comprising a movable carrier, scale-beams mounted thereon and each provided with an article-receiving platform, a chute to which the article to be weighed is delivered, the discharge end of said chute extending over the line of movement of the platforms, and feeding-fingers secured to the carrier at points adjacent to the platforms and adapted to engage the articles and transfer the same from the chute to the platform, the fingers traveling at the same speed as the platforms and causing the latter to gradually receive the articles as said platforms pass beneath the chute.

3. In a weight-testing device, a movable carrier, a plurality of scale-beams carried thereby and each provided with a receiving-platform, a feed-chute to which the articles to be weighed are delivered, the bottom of said chute being at a point immediately above the plane of the unloaded platforms, a feeding-finger secured to the carrier at a point adjacent to each platform and serving to engage the article and deliver the same from the chute to the platform, and discharging means disposed in different horizontal planes for engaging and delivering articles of different weight.

4. In weight-testing mechanism, the combination with a movable carrier, of a plurality of scale-beams mounted thereon and each provided with an article-receiving platform, a delivery-chute to which the articles to be tested are fed, the bottom of said chute being in a plane immediately above the horizontal plane of the unloaded receiving-platforms, an article-engaging finger secured to the carrier at a point adjacent to each platform and serving to engage and remove the articles from the chute, and a plurality of spaced discharging-cams arranged in different horizontal planes and adapted respectively to engage articles of different weight.

5. In weight-testing mechanism, the combination with a revoluble support, of a plurality of radially-disposed scale-beams each provided with a receiving-platform, an adjustable poise or counterbalance carried by each scale-beam, means for limiting the movement of the scale-beam, a feed-chute of which the lower portion is in a plane slightly above the plane of the unloaded platforms, a feeding-finger carried by the platform at a point immediately to the rear edge of each scale-platform and serving to engage the articles on the chute and deliver the same to the scale-platforms, and discharging means arranged at different levels for engaging and discharging articles of different weight.

6. In a weight-testing mechanism, a revoluble support, a plurality of scale-beams carried thereby and each provided with an article-receiving platform, a counterbalance weight or poise on each scale-beam, a vertically-slotted standard forming a guide for the scale-beam, an adjustable screw carried by the standard and serving as a means for limiting the upward movement of the scale-beam, a feed-chute having its lower portion in a plane slightly above the horizontal plane of the unloaded platforms, a feeding-finger carried by the support at a point immediately to the rear of each platform, article-discharging means, and mechanism associated with the chute for engaging and moving successive articles to the delivery-point.

7. In a weight-testing machine, a revoluble support, a plurality of weight-testing devices carried thereby, a feed-chute for delivering the articles to be tested to said testing devices, a revoluble disk arranged under the feed-chute and having peripheral fingers extending through a slot in the bottom of the chute for engagement with the successive articles, and a driving mechanism for imparting uniform speed to the carrier and the feeding-disk.

8. In a weight-testing machine, the combination with a movable support, of a plurality of testing devices carried thereby, a feed-chute having a slotted bottom, a revoluble disk having radial engaging fingers extending through the slot in the bottom of the chute and engaging successive articles, and a spring-pressed finger carried by the chute and projecting into the path of movement of the articles, substantially as specified.

9. In a weight-testing machine, the combination with a movable support, of a plurality of weight-testing devices carried thereby, a feed-chute, a feeding means associated with the chute, means for adjusting the vertical height of the chute, laterally-adjustable side walls forming a part of the chute, and means for discharging the articles from the testing devices.

10. In a device of the class specified, the combination with the base, of a vertical stationary spindle, a platform, a sleeve depending from the platform and mounted on said spindle, a collar bolted to the spindle and serving to maintain the horizontal position of the platform, a miter-gear carried by the sleeve, a driving-shaft, a miter-gear carried by the driving-shaft, weight-testing devices carried by the platform, a feed-chute, a feeding-disk having article-engaging fingers projecting into the chute, a shaft carrying said disk, sprocket-gears disposed on the driving-shaft and the disk-shaft respectively, and a link belt connecting said sprocket-gears, substantially as specified.

In testimony that I claim the foregoing as my own I have hereto affixed my signature in the presence of two witnesses.

WILLIAM H. COFFELT.

Witnesses:
   LILA M. BEARD,
   W. G. BEARD.